(12) United States Patent
Hall

(10) Patent No.: US 8,740,455 B2
(45) Date of Patent: Jun. 3, 2014

(54) SYSTEM AND METHOD FOR DISTRIBUTED ENVIRONMENTAL PARAMETER MEASUREMENT

(75) Inventor: Travis S. Hall, Radford, VA (US)

(73) Assignee: Baker Hughes Incorporated, Houston, TX (US)

( * ) Notice: Subject to any disclaimer, the term of this patent is extended or adjusted under 35 U.S.C. 154(b) by 203 days.

(21) Appl. No.: 12/962,786

(22) Filed: Dec. 8, 2010

(65) Prior Publication Data

US 2012/0147924 A1 Jun. 14, 2012

(51) Int. Cl.
*G01K 13/00* (2006.01)
*G01J 5/08* (2006.01)
*G01K 3/02* (2006.01)

(52) U.S. Cl.
USPC ........... 374/136; 374/161; 374/130; 374/137; 374/1; 356/43; 340/853.1; 702/6

(58) Field of Classification Search
USPC ......... 374/136, 132, 131, 130, 120, 161, 208, 374/137, 109, 110, 112, 1, 2, 129; 356/43; 324/104; 702/6; 340/853.1, 853.2, 340/853.3, 870.04, 870.17, 854.7, 854.9
See application file for complete search history.

(56) References Cited

U.S. PATENT DOCUMENTS

| | | | | |
|---|---|---|---|---|
| 4,375,164 A * | 3/1983 | Dodge et al. | ............... | 73/152.12 |
| 5,992,250 A * | 11/1999 | Kluth et al. | ................... | 73/866.5 |
| 6,511,222 B1 * | 1/2003 | Bouamra | ...................... | 374/161 |
| 7,349,610 B2 * | 3/2008 | Ohsono et al. | ................ | 385/123 |
| 7,401,530 B2 * | 7/2008 | Johansen | .................... | 73/861.04 |
| 7,529,434 B2 * | 5/2009 | Taverner et al. | ................ | 385/12 |
| 7,561,276 B2 * | 7/2009 | Boyd | ............................. | 356/480 |
| 7,561,771 B2 * | 7/2009 | Jaaskelainen et al. | ........ | 385/100 |
| 2003/0219190 A1 * | 11/2003 | Pruett | .............................. | 385/12 |
| 2006/0071158 A1 * | 4/2006 | Van Der Spek | .......... | 250/227.14 |
| 2006/0146909 A1 * | 7/2006 | Morse et al. | .................. | 374/130 |
| 2006/0214098 A1 * | 9/2006 | Ramos | .......................... | 250/256 |
| 2009/0114011 A1 * | 5/2009 | Csutak | ....................... | 73/152.52 |
| 2009/0310642 A1 * | 12/2009 | Skinner | ............................. | 374/1 |
| 2010/0107754 A1 * | 5/2010 | Hartog et al. | .............. | 73/152.47 |
| 2011/0134958 A1 * | 6/2011 | Arora et al. | ................... | 374/136 |
| 2011/0320147 A1 * | 12/2011 | Brady et al. | .................... | 702/66 |

FOREIGN PATENT DOCUMENTS

| | | | |
|---|---|---|---|
| EP | 277699 A2 | * | 8/1988 |
| JP | 61066134 A | * | 4/1986 |
| JP | 04318432 A | | 11/1992 |
| JP | 05241030 A | | 9/1993 |
| WO | 2006097671 A1 | | 9/2006 |

OTHER PUBLICATIONS

Notification of Transmittal of the International Search Report and the Written Opinion of the International Searching Authority, or the Declaration; PCT/US2011/059765; Apr. 27, 2012.
Skinner, et al. "Downhole Fiber-optic Sensing: The Oilfield Service Provider's Persepctive". Fiber Optic Sensor technology and Applications III. SPIE vol. 5589. pp. 206-220. 2004.

* cited by examiner

*Primary Examiner* — Gail Verbitsky
(74) *Attorney, Agent, or Firm* — Cantor Colburn LLP

(57) ABSTRACT

An apparatus for measuring environmental parameters includes: an optical fiber sensor configured to be disposed along a path in an environment to be measured, the path of the optical fiber sensor defining a longitudinal axis; and at least one section of the optical fiber sensor configured so that an entire length of the at least one section is exposed to an at least substantially homogeneous environmental parameter, at least part of the at least one section extending in a direction having a radial component relative to the longitudinal axis.

20 Claims, 4 Drawing Sheets

US 8,740,455 B2

SYSTEM AND METHOD FOR DISTRIBUTED ENVIRONMENTAL PARAMETER MEASUREMENT

BACKGROUND

Optical fiber sensors may be used to monitor many different parameters on structures or in selected environments. Examples of optical fiber sensors include Fiber Bragg Grating (FBG) sensors that may be utilized to detect strain in an optical fiber. Distributed temperature sensing (DTS) systems utilize fiber optic sensors to generate temperature information in downhole and other environments.

In order to ensure accurate temperature sensing downhole, DTS and other optical fiber sensors are generally calibrated prior to deployment. Such calibration is typically performed while the fiber sensors are at the surface and stored in coils. As fibers are deployed downhole, they are uncoiled and exposed to substantially different environmental conditions including high temperatures, high pressures and various chemical compositions. Deployment can alter the characteristics of the sensors and thus compromise the calibration performed at the surface. In addition, temperature gradients typically seen in fiber optic sensors deployed in downhole environments make the task of calibrating downhole sensors difficult.

SUMMARY OF THE INVENTION

An apparatus for measuring environmental parameters includes: an optical fiber sensor configured to be disposed along a path in an environment to be measured, the path of the optical fiber sensor defining a longitudinal axis; and at least one section of the optical fiber sensor configured so that an entire length of the at least one section is exposed to an at least substantially homogeneous environmental parameter, at least part of the at least one section extending in a direction having a radial component relative to the longitudinal axis.

A method of monitoring an environmental parameter measurement apparatus includes: disposing an optical fiber sensor along a path in an environment to be measured, the path of the optical fiber sensor defining a longitudinal axis, the optical fiber sensor including at least one section configured so that an entire length of the at least one section is exposed to an at least substantially homogeneous environmental parameter, and at least part of the at least one section extending in a direction having a radial component relative to the longitudinal axis; transmitting an electromagnetic measurement signal into the optical fiber sensor and receiving return signals from a plurality of measurement locations disposed in the optical fiber sensor and the at least one section; estimating the environmental parameter at each of the plurality of locations and generating a profile, the profile including at least one profile portion corresponding to the at least one section; and analyzing the at least one profile portion to monitor the performance of the optical fiber sensor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

There is provided an apparatus, system and method for monitoring and/or calibrating an optical fiber sensor. The apparatus includes at least one fiber optic sensor that is configured to be extended along a path in an environment to be measured, such as an interior of a borehole in an earth formation. One or more sections of the optical fiber sensor are configured as monitoring sections distributed at one or more locations along the path. Each monitoring section is configured so that an entire length of the section is exposed to a substantially homogeneous temperature or other environmental parameter i.e., having an approximately zero temperature (or other parameter) gradient along the length of the section. Each section may form a coil or other axially condensed configuration, such as a radially facing coil, an axially facing coil, or any other configuration in which at least part of the section extends in a direction having a radial component relative to a longitudinal axis of the optical fiber sensor path. In one embodiment, one or more monitoring sections are each disposed within a respective housing, which may define a thermally maintained region that maintains a substantially homogeneous temperature along the length of the monitoring section, In one embodiment, the apparatus, system and method are used to assist in calibrating downhole fiber optic sensors used in, for example, distributed temperature sensing (DTS) applications. Other uses include temporary or permanent monitoring of changes in optical fiber sensors, such as attenuation changes.

Figure 1:
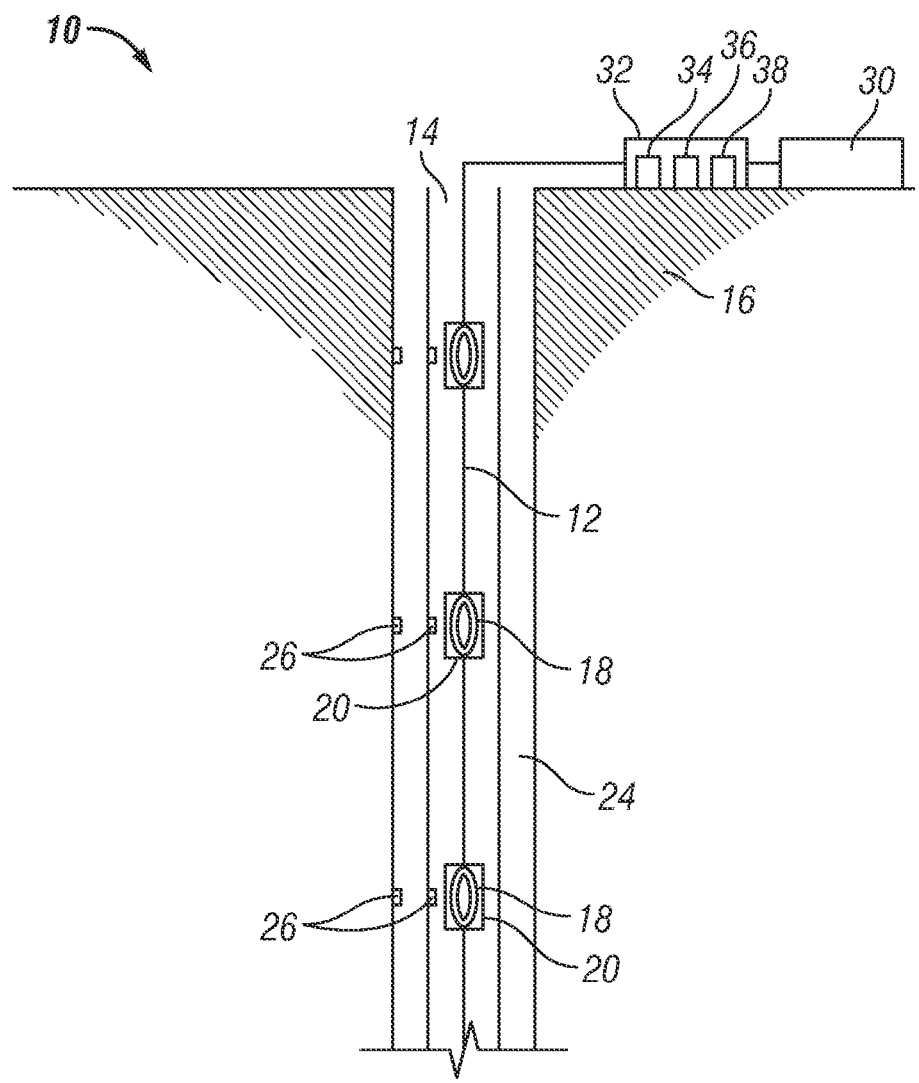
FIG. 1 is a cross-sectional view of a downhole parameter measurement system including an optical fiber sensor.

Referring to FIG. 1, a downhole measurement system 10 includes a fiber optic sensor assembly. The measurement system 10 may be used in conjunction with various downhole systems and components and includes an optical fiber sensor 12 disposed in a borehole 14 in an earth formation 16. The optical fiber sensor 12 includes one or more optical fibers having at least one core and cladding, and optionally a jacket or other protective covering. In one embodiment, one or more optical fibers are disposed as one or more cables. The configuration of the one or more optical fibers forming the optical fiber sensor is not limited and may be any configuration suitable to transmit measurement signals and receive return signals indicative of an environmental parameter.

The optical fiber sensor 12 includes one or more calibration/monitoring sections 18, each of which is formed by a selected length of the optical fiber sensor 12. Each of the monitoring sections 18 are configured to be maintained at a substantially homogeneous temperature or other parameter (e.g., pressure, axial strain, radial strain, and others) along the entire length of the section 18. For example, each monitoring section 18 is wrapped as a coil or otherwise configured so that the entire length of the section 18 is axially condensed and disposed in a localized region of the borehole 14 and/or is located at generally the same or similar depths. In one embodiment, each calibration/monitoring section 18 is housed within a housing 20, which may act as a protective housing and/or facilitate providing a region having a substantially zero temperature gradient. In one embodiment, the measurement system is a distributed temperature sensing (DTS) system. Although the measurement system 10 is described herein as a downhole system, it is not so limited and may be used for taking distributed temperature or other parameter measurements of any desired environment.

The monitoring sections 18 form a portion of the optical fiber sensor 12 that is exposed to at least substantially the same temperature along the entire length of the monitoring section 18. The section 18 is thus stable enough, i.e., changes in temperature along the length of each section 18 are small enough, so that for the purposes of measuring temperature or other parameters along the optical fiber sensor 12, the temperature values measured along the section 18 can be assumed to have approximately the same value.

In one embodiment, at least part of the monitoring section 18 deviates from the path of the fiber optic sensor 12, i.e., has a directional component that is perpendicular or radially extending relative to the longitudinal axis of the fiber optic sensor 12. In one embodiment, a substantial length of the fiber optic sensor 12, e.g., a length of the sensor 12 having a plurality or a minimum number of measurement locations, is disposed as part of the monitoring section 18. In one example, an approximately 50-150 meter length is disposed as part of the section 14, although any suitable lengths can be used that provide enough measurements to confirm whether a generally constant temperature is being measured and/or to determine a slope of the measurements. As described herein, "axial" refers to a direction that is at least generally parallel to a central longitudinal axis of the path of the optical fiber sensor 12. "Radial" refers to a direction along a line that is orthogonal to the longitudinal axis and extends from the longitudinal axis.

The optical fiber sensor 12 includes one or more measurement locations 22, such as Bragg gratings or Rayleigh scattering fiber regions, configured to return a signal indicative of an environmental parameter in response to an interrogation signal. Each of the optical fiber sensor 12 and the monitoring section 18 includes at least one measurement location 22. In one embodiment, the optical fiber sensor 12 and/or the monitoring section 18 includes a plurality of measurement locations 22.

The optical fiber sensor 12 may de deployed with a downhole string 24 such as a drillstring or production string, or may be deployed with a borehole casing. The optical fiber sensor 12 can be deployed downhole temporarily, for an extended period of time (e.g., during the operable life of a component or during the duration of a production, formation evaluation or other downhole operation) or permanently, e.g., by attaching the sensor to a downhole string or casing. There may be one or a plurality of monitoring sections 18, e.g., a plurality of sections 18 disposed periodically along the optical fiber sensor 12.

In one embodiment, one or more monitoring sections 18 act as calibration sections using the assumption that each section 18 is exposed to an approximately constant or homogeneous temperature (or other parameter) along the length of the monitoring section 14. For example, one or more independent temperature sensors 26 or other types of sensors are deployed in the environment (e.g., in the borehole 14) proximate to each monitoring section 18 or otherwise positioned at a location experiencing substantially the same parameter to be measured. The parameter measurements generated by the monitoring sections 18 can be compared to the corresponding independent sensor measurements to calibrate the optical fiber sensor 12. The independent sensors 26 may be any type of sensor, such as a fiber optic sensor and a temperature and/or pressure transducer.

Figure 2:
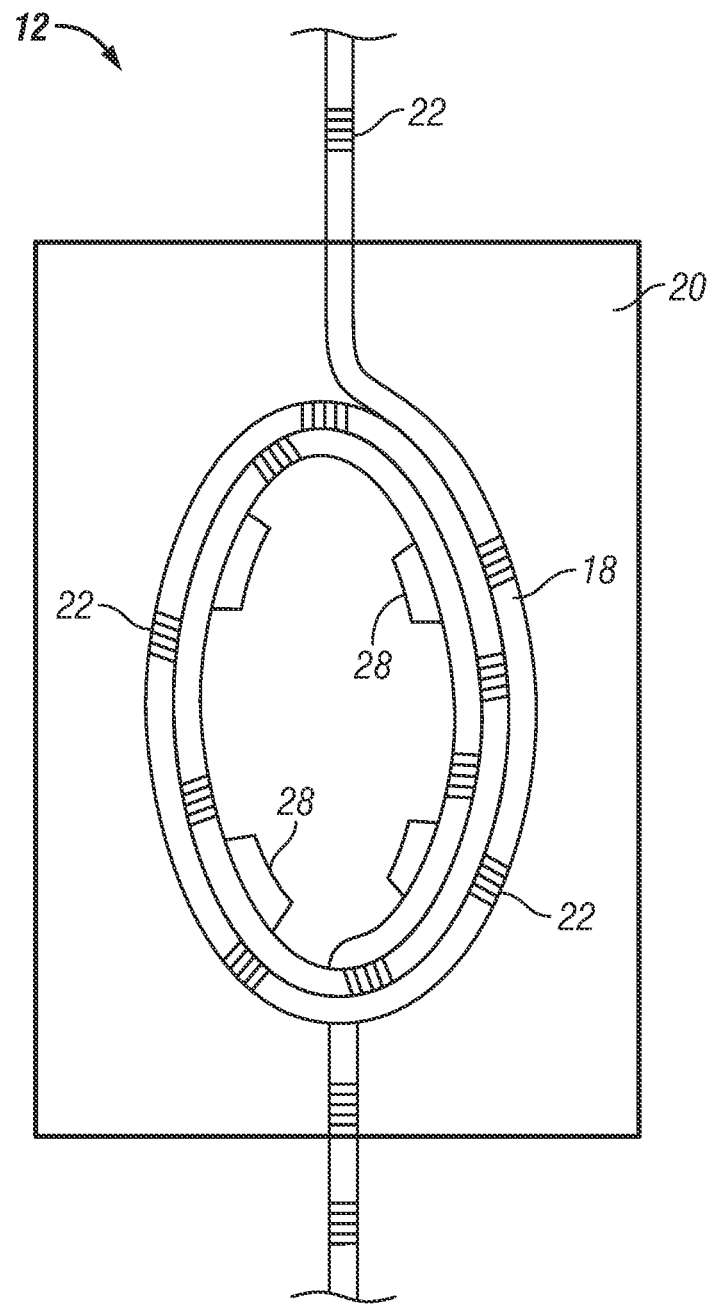
FIG. 2 is a cross-sectional view of an embodiment of a monitoring section of the optical fiber sensor of FIG. 1.

Referring to FIG. 2, in one embodiment, a monitoring section 18 of the fiber optic sensor 12 is wrapped in a coil or otherwise configured to axially condense or reduce the length of the section 18 relative to other lengths of the fiber optic sensor 12, or otherwise restrict the area in which the section 18 resides to a region of the environment having a substantially homogeneous temperature or other parameter. In the example shown in FIG. 2, the section 18 is wrapped in a coil that is at least partially radially-facing, i.e., in a plane at least partially parallel to the longitudinal axis of the borehole. The coil may be wrapped around a suitable structure 28 within the chamber 16. Other configuration examples include a section 18 that is an axially-facing coil and/or extends circumferentially about the longitudinal axis to restrict the section 18 to at least substantially the same depth or axial location along the borehole 14. The configurations described herein are exemplary and may be any configuration that restricts the section 18 to a region having a substantially homogeneous temperature or other environmental parameter.

The housing 20 may be made from any suitable material, such as steel or stainless steel able to withstand downhole temperatures. In one embodiment, the housing 20 is configured to thermally maintain a cavity or region within the housing 20 that has an at least substantially homogeneous temperature or other parameter. For example, the housing 20 may be made from one or more thermally insulating materials such as polymer materials, ceramic materials, foams, and/or define an evacuated chamber to facilitate thermal insulation. In one embodiment, the housing 20 includes an isothermal oven or other type of isothermal chamber.

The housing 20 and/or the monitoring section(s) 18 may be attached to, spliced to, or otherwise disposed with the fiber optic sensor 12 and/or other components disposed in the borehole 14 or other environment. For example, the housing 20 and/or monitoring section 18 is attached or integrated into to a surface of a downhole string 24 or pipe section. In this example, the housing 20 can shaped to match the curvature of the pipe section to minimize the section's footprint within the borehole.

Referring again to FIG. 1, the system 10 includes one or more processing units such as a surface processing unit 30 or a DTS unit 32. The DTS unit 32 may be any suitable device for transmitting interrogation signals into the optical fiber sensor 12, receiving return signals and/or processing the return signals. The DTS unit 32, for example, includes at least one radiation source 34 such as a pulsed laser for sending electromagnetic interrogation signals into the optical fiber sensor 12, a return signal sensor 36 to receive temperature (or other parameter) dependent return signals from the optical fiber sensor 12 and a processor 38 configured to receive return signal data and calculate the corresponding temperature or other parameter. The processing units, radiation sources and sensors described herein are not restricted to surface locations, and may be positioned at various downhole locations or other locations proximate to or remote from the optical fiber sensor 12 and/or the monitoring sections 18.

The measurement system 10 is not limited to that described herein. The measurement system 10 and/or optical fiber sensor 12 may be deployed and/or disposed in the borehole 14 via any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

Figure 3:
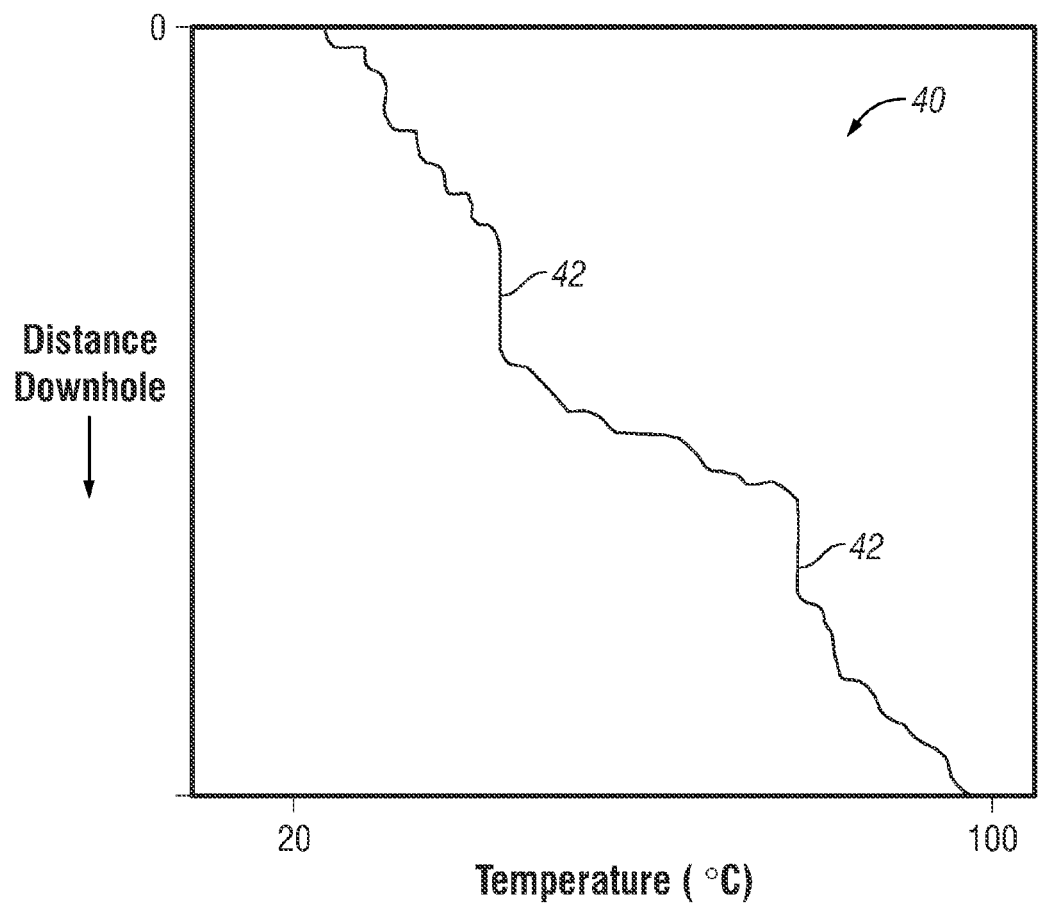
FIG. 3 illustrates an exemplary borehole temperature profile.
Figure 4:
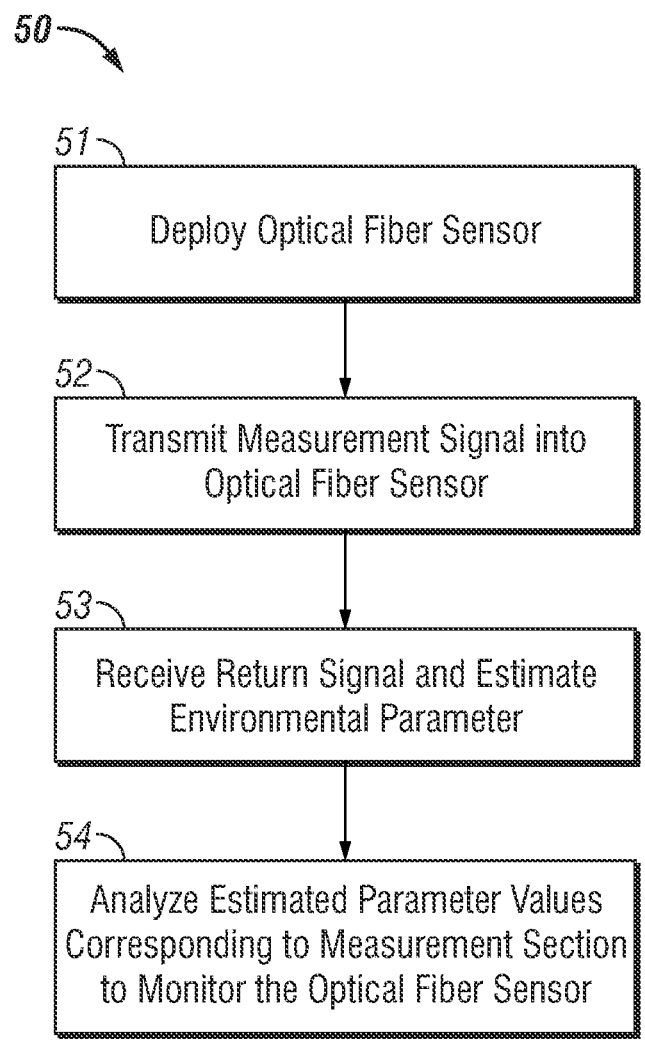
FIG. 4 is a flow chart illustrating an exemplary method of monitoring an environmental parameter measurement apparatus.

FIG. 3 illustrates an example of a temperature profile 40 generated by the fiber optic sensor 12. The temperature profile 40 shows the temperature values calculated from return signals received from various locations along the optical fiber sensor 12 at a certain time or over a certain time period. These return signals may be generated from, for example, Bragg gratings or Rayleigh scattering. As shown in FIG. 3, the temperature profile includes regions 42 of at least substantially constant temperature, which correspond to the lengths and temperatures of the monitoring sections 18.

It should be noted that the regions of substantially constant temperature may not correspond to depth, but correspond to the length of each section 18. Thus, measurement data generated from the optical fiber sensor 12 may be compensated to reflect the actual depth represented by the sections 18 and the optical fiber sensor 12.

FIG. 8 illustrates a method 50 of monitoring an environmental parameter measurement apparatus, such as the optical fiber sensor 12. The method 50 includes one or more stages 51-54. In one embodiment, the method 50 includes the execution of all of stages 51-54 in the order described. However, certain stages may be omitted, stages may be added, or the order of the stages changed.

In the first stage 51, an optical fiber sensor 12 such as a DTS sensor is disposed in an environment to be measured. For example, the optical fiber sensor 12 is deployed downhole into an earth formation borehole 14 so that the optical fiber sensor 12 defines a path that extends generally along the borehole 14. Upon deployment, one or more calibration/monitoring sections 18 are deployed. In one embodiment, a plurality of monitoring sections 18 are located along a length of the optical fiber sensor 12. Deployment can be affected, for example, by lowering the fiber along with a wireline, drillstring (e.g., during a drilling and/or logging while drilling operation), production string or any other carrier. In one embodiment, the optical fiber sensor 12 and the sections 18 are deployed permanently or for an extended period of time, for example, by attaching the optical fiber sensor 12 and/or the sections 18 to a borehole string 24, casing or other component.

In the second stage 52, a measurement signal such as light having one or more selected wavelengths is generated and transmitted into the optical fiber sensor 12 via, for example, the DTS unit 32. The optical fiber sensor 12 and/or measurement locations 22 reflect a portion of the measurement signal as a return signal that is indicative of temperature or another parameter. The return signal is received by the DTS unit, surface processing unit 30 or other appropriate user or processor.

In the third stage 53, the return signal for each measurement location 22 is received and a parameter is estimated. For example, the spectral change of a return signal from a measurement location 22 in the optical fiber sensor 12 is used to estimate the temperature of the optical fiber sensor 12 at the corresponding location and/or depth. In addition, other parameters such as tensile force, strain and pressure may also be determined from the return signals. In one embodiment, the estimated temperatures are correlated with corresponding depths and/or locations along the optical fiber sensor 12, for example, as shown in the temperature profile 40 of FIG. 3.

In the fourth stage 54, the estimated parameters along the fiber optic sensor are analyzed to monitor the performance of the optical fiber sensor 12. In one embodiment, monitoring includes calibrating the fiber optic sensor 12 by comparing estimated temperature values in at least one monitoring section 18 with temperature values taken from a corresponding independent temperature sensor(s) 26. The independent temperature measurements are taken from sensors 26 located proximate to corresponding monitoring sections 18 and/or in locations experiencing substantially the same temperature or other parameter as the corresponding monitoring sections 18 (e.g., at the same or similar depths or locations along the borehole 14). The optical fiber sensor 12 can be calibrated at or before the start of an operation and calibration adjustments can also be made over time.

In one embodiment, monitoring includes monitoring the estimated temperature values in at least one monitoring section 18 to determine whether any temperature gradient exists or develops over time and/or monitoring any changes in the estimated temperature values. Such monitoring can be used to track any attenuation changes in the optical fiber. For example, temperature values including attenuation and slope (e.g., as seen in FIG. 3) from the isolated section are monitored over time and analyzed to study any attenuation changes and other performance effects, such as effects due to hydrogen (e.g., hydrogen darkening), moisture, microbends, macrobends and others. A change in the estimated temperature and/or a slope (e.g., a temperature line such as region 42 that is not at least substantially vertical) in the data generated for a monitoring section 18 may indicate attenuation or other degrading effects on the optical fiber sensor.

The apparatuses and methods described herein provide various advantages over existing methods and devices. For example, the system allows for a user and/or processor in easily calibrating or re-calibrating optical fiber sensors while they are disposed downhole or deployed in an environment to be measured, as well as monitoring the performance and condition of optical fiber sensors.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. An apparatus for measuring environmental parameters, comprising:
   a carrier configured to be disposed in a borehole in an earth formation;
   an optical fiber sensor disposed at the carrier, the optical fiber sensor including an optical fiber having a length configured to be disposed along a path in an environment to be measured and including at least one measurement location disposed therein, the path of the optical fiber defining a longitudinal axis; and
   at least one section of the optical fiber sensor including a portion of the length of the optical fiber having a plurality of measurement locations extending along the portion and configured to provide environmental parameter measurements, the plurality of measurement locations of the portion of the length disposed at substantially the same location on the longitudinal axis to maintain the plurality of measurement locations at an at least substantially homogeneous environmental parameter; and
   a processor configured to receive the environmental parameter measurements from the plurality of measurement locations and calibrate the optical fiber sensor based on the environmental parameter measurements.

2. The apparatus of claim 1, wherein the environmental parameter includes temperature.

3. The apparatus of claim 1, wherein the portion of the length includes a coiled length of the optical fiber sensor.

4. The apparatus of claim 3, wherein the coiled length defines a plane selected from at least substantially parallel and at least substantially perpendicular to the longitudinal axis.

5. The apparatus of claim 1, wherein the portion of the length is disposed in a housing that forms a thermally maintained region having a substantially homogeneous temperature therein.

6. The apparatus of claim 5, wherein the housing is made from at least one of a thermally insulating material and an isothermal material.

7. The apparatus of claim 1, wherein the at least one section includes a plurality of sections disposed axially along the path.

8. The apparatus of claim 1, wherein the optical fiber sensor is a distributed temperature sensing (DTS) device.

9. The apparatus of claim 1, wherein the environment is a downhole environment and the longitudinal axis corresponds to a borehole axis.

10. The apparatus of claim 1, wherein the processor is configured to calibrate the optical fiber sensor when the optical fiber sensor is disposed in the borehole.

11. The apparatus of claim 1, wherein the measurement locations are selected from at least one of Bragg gratings and Rayleigh scattering locations.

12. The apparatus of claim 1, further comprising an independent environmental parameter sensor located proximate to the at least one section.

13. A method of monitoring an environmental parameter measurement apparatus, comprising:
   disposing an optical fiber sensor along a path in an environment to be measured, the optical fiber sensor including an optical fiber having a length disposed along a path defining a longitudinal axis and including at least one measurement location disposed therein, the optical fiber sensor including at least one section including a portion of the length of the optical fiber having a plurality of measurement locations disposed along the portion, the plurality of measurement locations of the portion of the length disposed at substantially the same location on the longitudinal axis to maintain the plurality of measurement locations at an at least substantially homogeneous environmental parameter;
   transmitting an electromagnetic measurement signal into the optical fiber sensor and receiving return signals from the at least one measurement location disposed in the axial length of the optical fiber and the plurality of measurement locations disposed in the portion of the length;
   estimating the environmental parameter at each measurement location and generating a profile, the profile including at least one profile portion corresponding to the portion of the length; and
   calibrating the optical fiber sensor based on the at least one profile portion.

14. The method of claim 13, wherein the environmental parameter includes temperature.

15. The method of claim 13, wherein the portion of the length includes a coiled length of the optical fiber.

16. The method of claim 13, wherein the portion of the length is disposed in a housing that is made of a material able to withstand a downhole environment.

17. The method of claim 16, wherein the housing forms a thermally maintained region having a substantially homogeneous temperature therein.

18. The method of claim 13, wherein calibrating the optical fiber sensor includes comparing the at least one profile portion to an independent environmental parameter measurement taken at a location proximate to the at least one section.

19. The method of claim 13, wherein calibrating includes monitoring environmental effects on the optical fiber sensor by analyzing changes in the at least one profile portion.

20. The method of claim 13, wherein the environment is a downhole environment and the longitudinal axis corresponds to a borehole axis.

* * * * *